Sept. 30, 1930.     F. M. LUCHS     1,776,813
RECEPTACLE COVER
Filed April 23, 1928
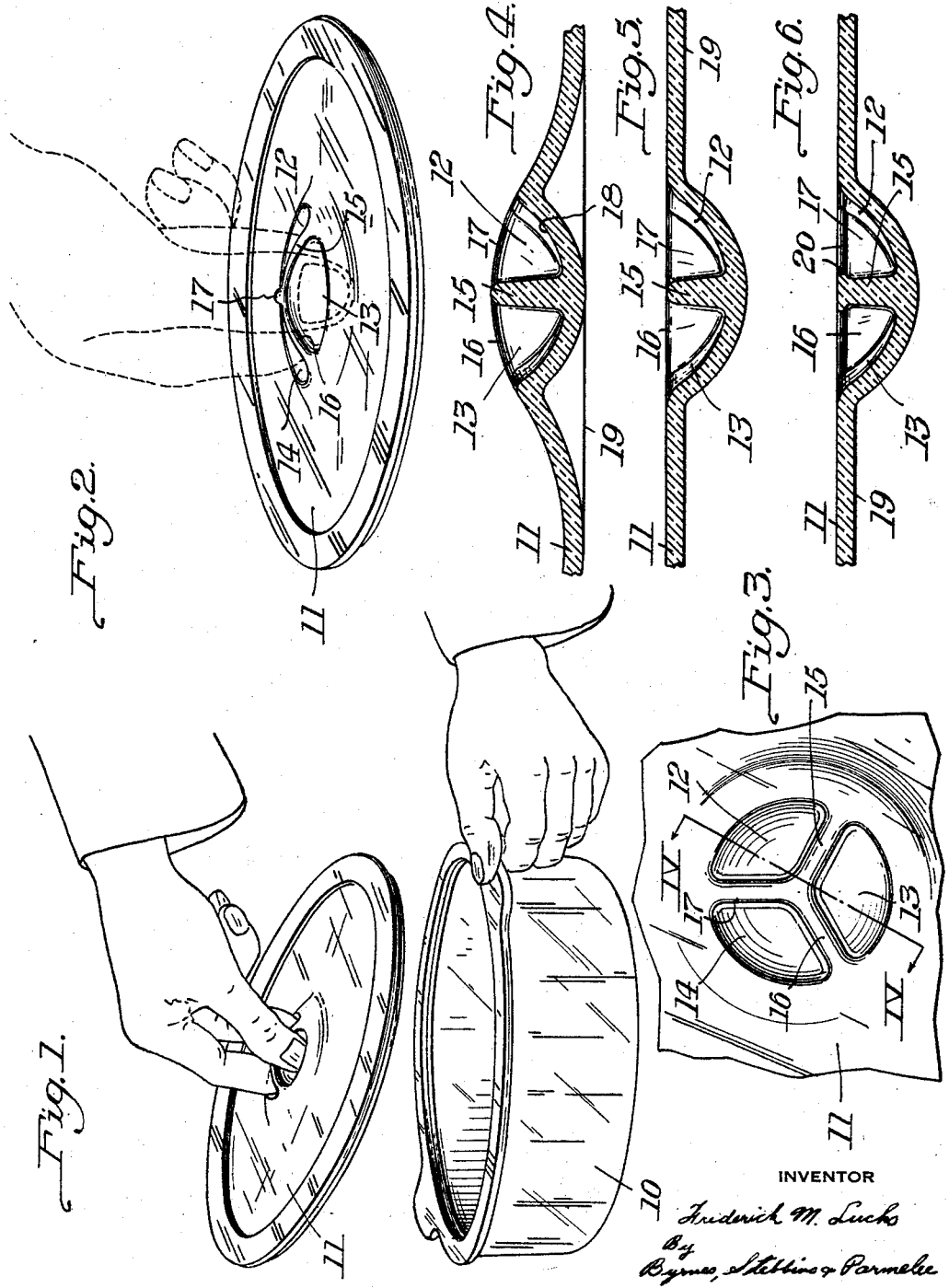
INVENTOR
Frederick M. Luchs
By
Byrnes, Stebbins & Parmelee
His Attys.

Patented Sept. 30, 1930

1,776,813

UNITED STATES PATENT OFFICE

FREDERICK M. LUCHS, OF PITTSBURGH, PENNSYLVANIA, ASSIGNOR TO UNITED STATES GLASS COMPANY, OF PITTSBURGH, PENNSYLVANIA, A CORPORATION OF PENNSYLVANIA

RECEPTACLE COVER

Application filed April 23, 1928. Serial No. 272,001.

This invention relates to a cover for a receptacle, and more particularly to a cover for a glass receptacle, such as a cooking or serving utensil. An object of the invention is to provide a cover for a utensil having a gripping member which may be simply and economically produced.

A further object of the invention is to provide a cover for a receptacle which has a gripping element adapted to be easily and naturally gripped by at least three fingers of the hand.

A further object of the invention is to provide a cover of the character referred to by which the area of the surface of the member which is gripped by the fingers of the hand is greatly increased.

A further object of the invention is to provide a device of the character above referred to in which the fingers will easily and naturally grip the portion of the device which is to be lifted.

In the drawings, wherein I have shown several preferred embodiments of the invention:

Figure 1 is a perspective view of a receptacle and cover.

Figure 2 is a similar view of the cover showing the position of the fingers while in gripping position.

Figure 3 is a fragmentary plan view of the cover grip.

Figure 4 is a cross section on the line IV—IV of Figure 3.

Figures 5 and 6 are similar views of modified forms of the invention.

Referring to Figures 1, 2 and 3 of the drawing, a receptacle 10, which may be of any desired material, but which in the present preferred embodiment is made of glass, is provided with a cover 11, adapted to fit the receptacle. The cover is provided with a plurality of pockets 12, 13 and 14, which are separated by ribs 15, 16 and 17. These ribs, as shown in Figure 4 are tapered slightly toward their upper edges, so that the cover and gripping member may be conveniently made by pressing or molding. By reference to this figure, it also will be noted that the walls 18 of the pockets 12, 13 and 14 are curved downwardly and inwardly towards the ribs which separate the pockets. By this arrangement, as the fingers are inserted into the pockets, they are naturally forced toward and into contact with the ribs, which are gripped during the lifting operation. From this figure, it also will be seen that the pockets of the lifting element are in a position above the plane 19 of the receptacle cover. This arrangement of the lifting element above the plane of the cover has the advantage that the fingers when in contact with the ribs are at a greater distance from the source of heat which may be applied to the receptacle.

However, in some instances, it is desirable to provide a receptacle cover, the lifting element of which does not extend above the plane of the cover. Therefore, as shown in Figures 5 and 6, in order to minimize the space occupied by the receptacle and cover, the lifting element formed of the pockets and ribs may be so arranged that the element is entirely below the plane of the cover of the receptacle.

As shown in Figure 6, in order to increase the gripping power of the lifting element, the ribs may be provided adjacent their upper edges with enlargements 20.

It is to be noted that in all of the forms of the invention which have been shown, the ribs separating the various pockets which go to make up the gripping member are connected at their inner ends to each other at an angle, which preferably is less than 180°. By so forming the ribs, when the fingers are inserted into the gripping element, each of the fingers contacts with two of the ribs. This arrangement provides a greatly increased area of contact between the fingers and the lifting element, so that the cover may be raised much more easily than if it were provided with a simple cross bar which would provide a much smaller area of contact between the finger and the lifting element.

The receptacle and cover therefor which have been shown in the drawings are preferably made of glass, but the invention is applicable equally as well to any receptacle of any shape whatsoever, no matter what the material employed may be.

It is to be understood that the forms of the invention herewith shown and described are to be taken as preferred examples of the same, and that changes may be made in the shape, size and arrangement of parts without departing from the spirit of the invention or the scope of the appended claims.

I claim:

1. A cover for a receptacle provided with at least three pockets extending below a portion of the cover and adapted to receive fingers, said pockets being separated by ribs provided adjacent their tops with enlarged portions.

2. A cover for a receptacle provided with at least three pockets extending below a portion of the cover and adapted to receive fingers, said pockets being separated by ribs connected at their inner ends at angles which are less than 180° to provide a large gripping surface for the fingers.

3. A cover for a receptacle provided with at least three pockets extending below a portion of the cover and adapted to receive fingers, said pockets being separated by ribs having enlarged portions formed adjacent their upper edges and being connected at their inner ends at angles which are less than 180° to provide a large gripping surface for the fingers.

4. A cover for a receptacle provided with at least three pockets adapted to receive fingers, said pockets being separated by ribs having enlarged portions formed adjacent their upper edges and being connected at their inner ends at angles which are less than 180° to provide a large gripping surface for the fingers, the walls of the pockets being curved downwardly and inwardly towards said ribs.

5. A receptacle cover provided with a pocket extending below a portion of the cover, interconnected ribs dividing the pocket into at least three pockets, the ribs and pockets being deep enough to provide effective gripping surfaces for the fingers to lift the cover.

6. A receptacle cover provided with at least three pockets adapted to receive the fingers of one lifting the cover, the pockets being bounded by portions of the cover and ribs formed integral with the cover, the pockets curving downwardly and inwardly toward the base of the ribs, the ribs being connected at an angle such that each finger when in gripping position will contact with a plurality of the ribs.

In testimony whereof I have hereunto set my hand.

FREDERICK M. LUCHS.